UNITED STATES PATENT OFFICE.

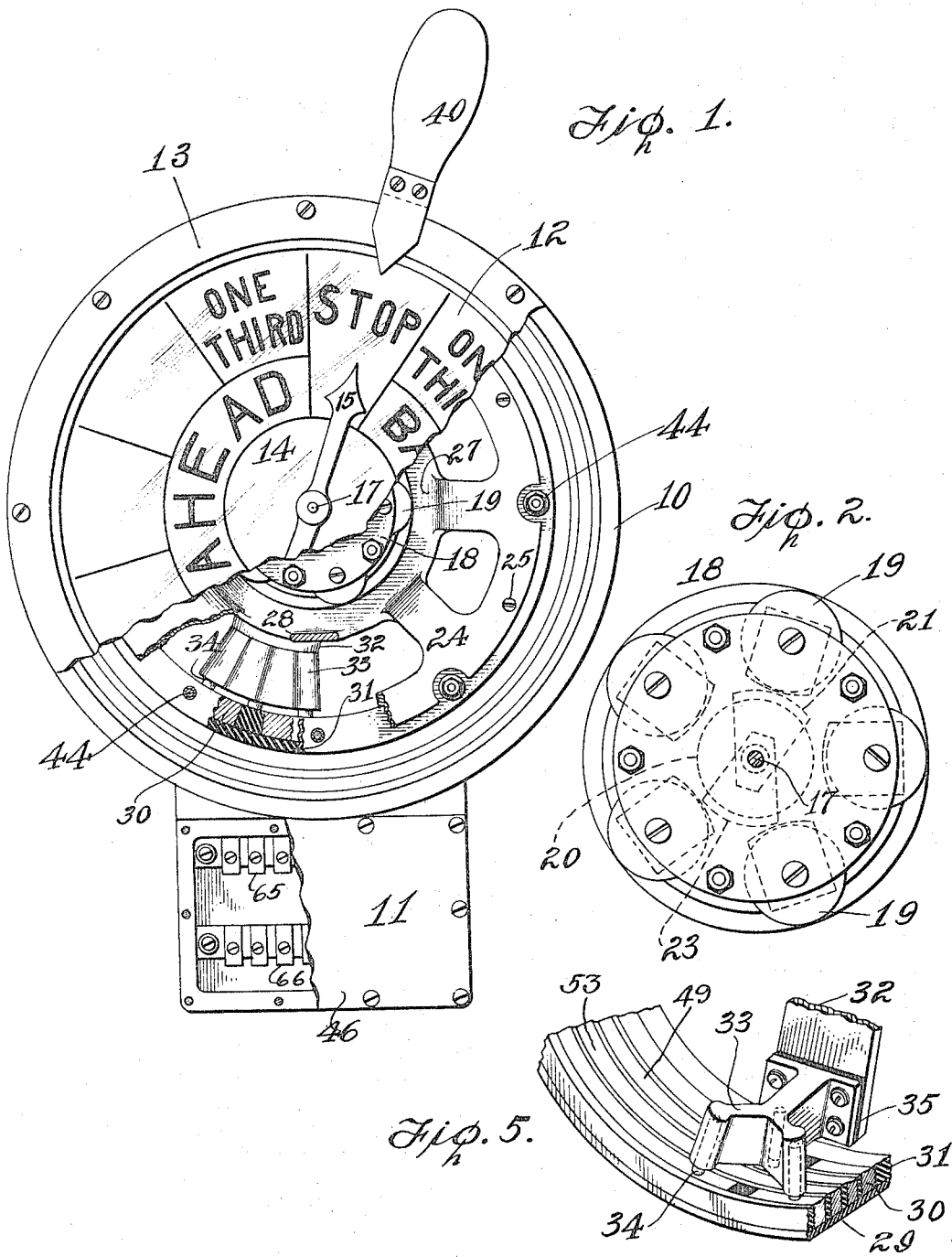

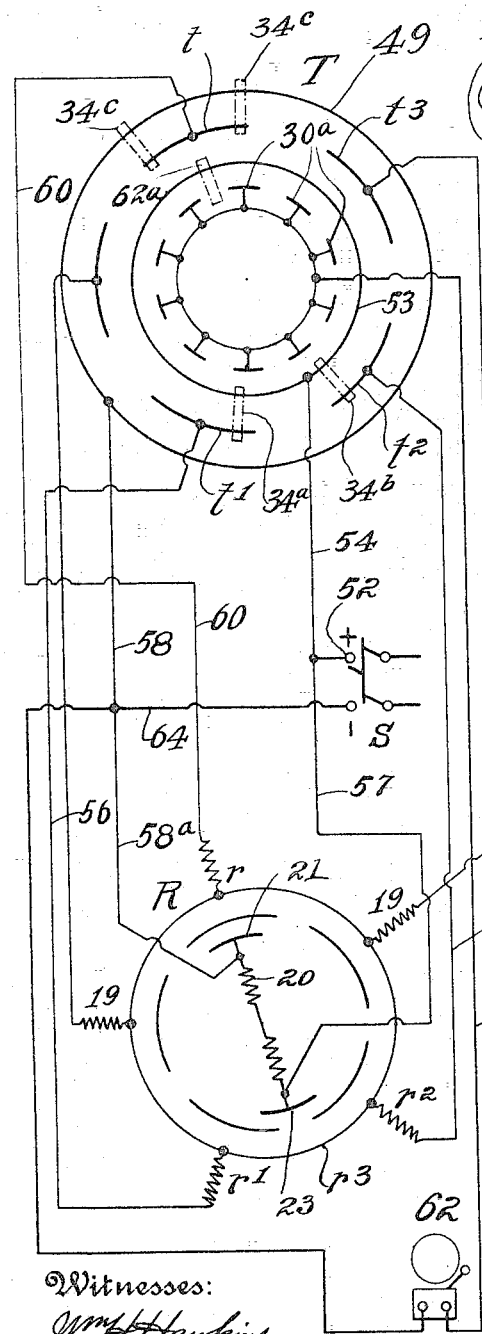
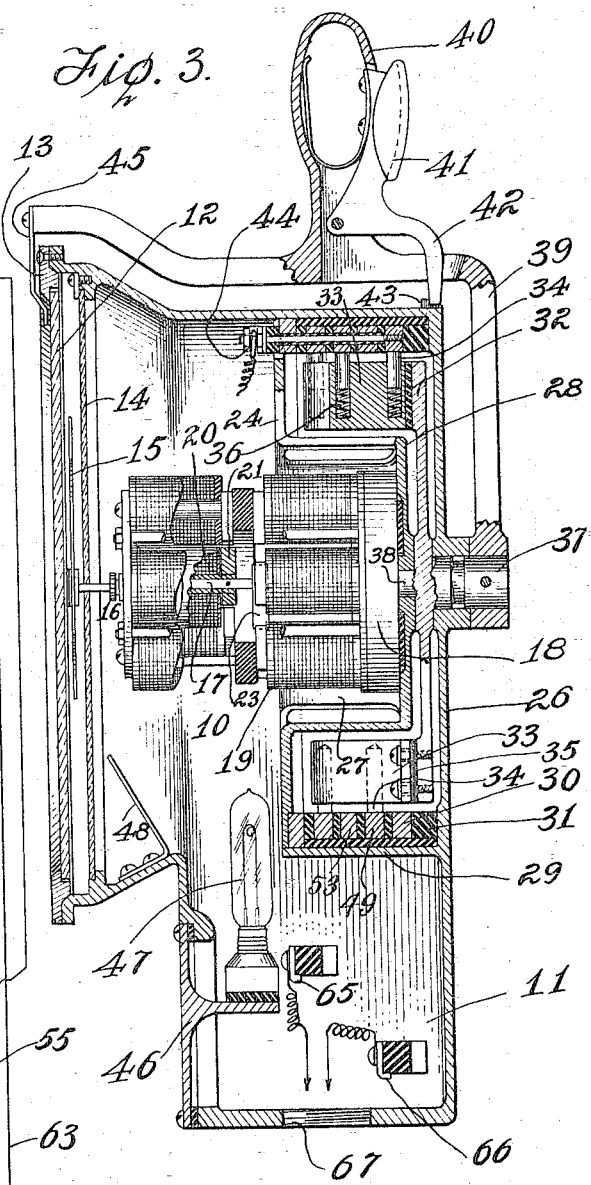

FRANK W. WOOD, OF BROOKLYN, NEW YORK, ASSIGNOR TO CHARLES CORY & SON, INC., OF NEW YORK, N. Y., A CORPORATION OF NEW YORK.

ELECTRICAL TELEGRAPH AND INDICATOR SYSTEM.

1,216,533.

Specification of Letters Patent.

Patented Feb. 20, 1917.

Application filed June 24, 1915. Serial No. 36,022.

*To all whom it may concern:*

Be it known that I, FRANK W. WOOD, a citizen of the United States, residing at Brooklyn, in the county of Kings and State of New York, have invented new and useful Improvements in Electrical Telegraph and Indicator Systems, of which the following is a specification.

This invention relates to a combined electrical order transmitting and receiving instrument, and while the instrument may be used in transmitting signals for any purpose, it is expected to be largely used on shipboard for transmitting orders between different points on the ship.

A principal object of the invention is to produce an instrument which is very compact and simple in construction, but which will operate effectively both as a sending and a receiving instrument.

A further object of the invention is to produce a very simple and compact instrument for transmitting and receiving orders or signals which will indicate in a very simple manner the character of the order which is being transmitted and which will also indicate whether the order is understood by the person who receives it. A further object is to provide special means for indicating when the character of the transmitted order is changed.

Further objects of the invention will appear more fully hereinafter.

The invention consists in the general combination of parts and details, all of which contribute to produce an efficient combined order transmitting and receiving instrument.

A preferred embodiment of the invention is described in the following specification while the broad scope of the invention is pointed out in the appended claims.

In the drawing,

Figure 1 is a front elevation of an instrument embodying my invention, certain parts being broken away and others shown in section.

Fig. 2 is a front elevation of an embodiment of electro-magnetic means which may be employed, if desired, in connection with the receiving circuit passing through the instrument.

Fig. 3 is a vertical central section through the complete instrument, certain parts being broken away and others shown in elevation.

Fig. 4 is a diagram indicating a simple wiring arrangement which may be employed to connect up two instruments which embody my invention.

Fig. 5 is a perspective upon an enlarged scale showing details of mechanism which may be employed for closing the transmitting circuits from the instrument.

In the embodiment of the invention illustrated, 10 represents a case which may be of any suitable construction, but which is preferably of substantially circular form such as that shown in Fig. 1, with a recess or terminal box 11 formed in the case on its lower side. If this case is to be used on shipboard or exposed to the weather, it is preferably made weather-tight and provided with a glass or window 12 on its front, which may be held in place by an annular cover 13. Behind this glass I prefer to provide a translucent dial 14 of frosted glass or other similar material. In the embodiment illustrated this dial is provided with opaque letters indicating the significance of the different points of the dial. Between the glass 12 and the dial 14 I prefer to provide a pointer or indicating needle 15 which forms part of an indicating member 16 which includes a spindle 17 preferably mounted to rotate on an axis at right angles to the dial and preferably located on a line with the center of the dial.

This indicating member 16 is controlled preferably by a similar instrument from a distant point through the medium of a receiving circuit running into the instrument illustrated.

In order to control the indicating member 16 I prefer to provide indicating mechanism 18 which in the present embodiment comprises a plurality of electro-magnets 19 which are preferably disposed circumferentially about the spindle 17 and these electro-magnets, if desired, may be in two sets, one of which is disposed farther back in the case than the other set. When the instrument illustrated is receiving an order, these electro-magnets are energized in succession so as to cause the rotation of the indicating member. In order to effect this result, the spindle 17 is preferably provided with short radial arms 21 and 23 which form armatures to be attracted by the magnets. These armatures are preferably disposed diametrically opposite to each other (see Fig. 2).

The spindle 17 passes through two coils 20. When these coils 20 are energized by a passing current, they polarize the armatures 21 and 23. This arrangement gives an increased indicating range to the pointer or needle 15 but as this effect is merely a matter of detail, a further description of the same is unnecessary.

The electro-magnetic means 18 is preferably supported on a holder or spider 24 the outer portion of which is preferably supported within the case by any suitable means such as small screws 25 (see Fig. 1). The middle portion of the holder is offset rearwardly toward the rear wall 26 of the case so as to form a pocket 27 in which the electro-magnetic means 18 is received, and the middle portion of the holder is preferably formed into a disk 28 which lies very near and parallel to the rear wall 26 of the case.

In order to close transmitting circuits to another instrument, I prefer to provide a plurality of contacts within the case and these contacts are preferably disposed circumferentially around the electro-magnetic means 18. For this purpose I prefer to provide an annular or cylindrical wall 29, part of which may form a portion of the wall of the case, and on the inner face of this wall I provide a plurality of contact segments indicated generically by the number 30, which are set in insulation 31 in the inner face of the wall. Some of these segments are of ring form but others are true segments.

Coöperating with these segments I prefer to provide a hand-operated movable contact device 32. This member is preferably a rotatable arm pivotally supported at its middle point and having insulated heads 33 (see Fig. 5) which form housings for contact brushes indicated generically by the number 34 which may come in contact with the different segments in a number of different positions such as that indicated in Fig. 5. These contact heads 33 are supported on insulation 35 so that they are insulated from the arm or body 32 of the contact device. The brushes 34 may be simple cophite brushes mounted in sockets and pressed outwardly by coil springs 36.

The rotatable contact member 32 is preferably rotatably mounted in the rear wall of the case by means of a stub shaft 37 and this stub shaft has a neck 38 on its inner end which is rotatably received and supported in the middle portion or disk 28 of the holder or spider 24. A lever 39 or similar means is attached to the stub shaft 38 for rotating the contact device and the upper end of this lever is preferably formed into a handle 40, and a finger clutch 41 is provided having a dog 42 which may engage projections or teeth 43 on the rim of the case to lock the handle lever in any position desired. The different segments 30 are provided with suitable binding posts 44 to which the connecting wires for the circuits within the case may be attached. When the handle 40 is moved to any position on the dial, the contact device closes the corresponding transmitting circuits to another instrument preferably like that illustrated, and closes the circuit through mechanism in the other instrument similar to the electro-magnetic mechanism 17. This affects the indicating needle of the distant instrument; the order intended is then read from the dial; having understood the signal, the distant instrument is then operated to transmit back or repeat the order which he has received back to the sending instrument. In other words, he moves his handle corresponding to the handle 40 to the same position on the dial to which his pointer (corresponding to 15) has been moved. In doing so, he closes circuits through the instrument which originally sent the signal, that is, he closes receiving circuits through the instrument illustrated and thereby affects the pointer 15 of this instrument; and if he has correctly understood the signal sent him, the pointer 15 of the instrument which originally sent the signal will come into position in line with the lever 39. In order to enable this alining position to be determined accurately the lever 39 is preferably extended toward the front and provided with a pointer 45 which moves along near the edge of the dial. In this way two properly connected signals enable an order to be given and repeated back to the sender. The other instrument referred to is preferably of substantially the same construction as that illustrated. Evidently when this instrument is constructed according to my invention it constitutes a very compact instrument in which all the parts are nicely housed and readily accessible in the case.

In order to illuminate the dial 14, I prefer to provide the forward side of the box 11 with a removable cover 46 which may carry an electric light 47, and in order to diffuse the light on the face of the dial, I prefer to provide a small screen such as the screen 48 within the case near the lower edge of the dial. This screen reflects a large part of the light up into the interior of the case and diffuses the light so that the dial is very uniformly illuminated.

A simple arrangement of wiring for connecting up two instruments embodying the features set forth, is illustrated in Fig. 4, in which T represents the transmitting instrument and R represents the receiving instrument, but it is understood that the wiring simply shows one phase of the operation, namely, the sending of the order from the instrument T to the instrument R. When the order has been received, it can be sent back from the instrument R to the instrument T by a similar wiring system. However, in order to prevent confusion of the wiring in the diagram, the figure simply shows the wiring for sending the signal or order in the one direction. This wiring is very simple. The segments 30 are simply connected up so that each segment is connected by a wire with a correspondingly placed electro-magnet in the other instrument. I prefer to provide five equidistant circumferentially disposed segments in the transmitting instrument and five correspondingly located electro-magnets indicated at 19 on the instrument R. For a given position such as that indicated in Fig. 4, two of the brushes 34 indicated specifically at $34^c$ at one end of the contact device 32 are in contact with one of the segments indicated specifically by the reference letter $t$ and at this time the two opposite brushes $34^a$ and $34^b$ will be in contact with two nearly opposite segments indicated specifically by the letters $t'$ and $t^2$. A continuous contact segment or ring 49 is always in contact with the brushes $34^c$. The brushes $34^a$ and $34^b$ are always in contact with a continuous contact segment or ring 53. The circuit from the line switch S is as follows: from the terminal 52 through conductor 54 through the continuous segment ring 53; from this ring by brush $34^b$ through segment $t^2$ and thence by conductor 55 through the coil or magnet $r^2$; then through segment ring $r^3$ and through wire coil $r$ and wire 60 to segment $t$; thence by brushes $34^c$ to ring 49 and thence by wire 58 to wire 64. The current also passes by a brush $34^a$ through segment $t'$ and thence by conductor 56 through the coil or electromagnet $r'$; then by the same path as above through segment ring $r^3$, etc. Another circuit passes from the terminal 52 through conductor 57 and through the coils 20 on the armature; thence passing by conductor $58^a$ to wire 64. If the contact device is moved toward the right from the position in which the brushes are indicated in Fig. 4 so that it comes to the next position, the circuits are substantially the same except that the brushes $34^c$ will contact with the segments $t$ and $t^3$ while both brushes $34^a$ and $34^b$ will contact with the segment $t'$ only. It is not necessary to trace such new circuits because the circuits already described are typical.

Furthermore, in order to indicate when the contact device is moved to change the character of the signal or order transmitted, I prefer to provide an alarm device or bell 62. The circuit through this bell or alarm is controlled by a special brush or contact $62^a$ which is always in contact with the aforesaid inner segment ring 53. As the contact device is passing from one signal to another, this brush $62^a$ connects the segment ring 53 with one of the inner segments $30^a$. These segments are ten in number and are in intermediate positions with respect to the lever positions for the different orders. They are all connected with a conductor 63 which is connected with the alarm device 62 and the other terminal of the alarm device is connected by a conductor 64 with the minus side of the line. With this arrangement, evidently, if there is a change in the signal, the bell will ring and this will call the attention of the person at the instrument to the fact that the signal has been changed. This makes it unnecessary for the person at the receiving instrument to keep his eye constantly on the dial.

The wires from the different electro-magnets within the case are most conveniently attached to terminals 65 and 66 mounted on insulating blocks (see Fig. 3) said blocks being disposed in the aforesaid box 11. The lower part of this box may be provided with a threaded opening 67 to receive a pipe or conduit for the electric cable which connects the two or more instruments.

It is understood that the embodiment of the invention set forth herein is only one of the many embodiments or forms the invention may take, and I do not wish to be limited in the practice of the invention nor in my claims to the particular embodiment set forth. And I may use any feature of my invention without the other features.

What I claim is:

1. A combined electrical order transmitting and receiving instrument, comprising, in combination, an indicating member for indicating an order received by the instrument, electro-magnetic means for controlling said indicating member by a receiving circuit, a hand-operated contact device for closing transmitting circuits to transmit an order from the instrument, and a plurality of contacts coöperating therewith and disposed in a substantially circumferential arrangement substantially surrounding said electro-magnetic means.

2. A combined electrical order transmitting and receiving instrument, comprising, in combination, an indicating member rotatably mounted for indicating an order received by the instrument, electro-magnetic means for controlling said indicating member by a receiving circuit, a hand-operated contact device for closing transmitting circuits to transmit orders from the instrument, a plurality of contacts coöperating therewith and disposed in a substantially circumferential arrangement substantially surrounding said electro-magnetic means, a hand-operated indicating member moving when said hand-operated contact device is moved, and a common signal dial coöperating with both said indicator members.

3. A combined electrical order transmitting and receiving instrument comprising, in combination, a case, a rotatable indicating member for indicating a signal received by the instrument, electro-magnet means within said case to be connected in a receiving circuit for controlling said indicating member electrically from a point outside of the case, a hand-operated contact device rotatably mounted within the case for closing transmitting circuits leading from the instrument to transmit an order from the instrument, and a plurality of contact segments within said case coöperating therewith and disposed in a substantially concentric arrangement around said electromagnetic means.

4. A combined electrical order transmitting and receiving instrument comprising, in combination, a case, a rotatable indicating member for indicating a signal received by the instrument, electro-magnetic means within said case to be connected in a receiving circuit for controlling said indicating member electrically from a point outside of the case, a hand-operated contact device rotatably mounted within the case for closing transmitting circuits leading from the instrument to transmit an order from the instrument, a plurality of contact segments within said case coöperating therewith and disposed in a substantially concentric arrangement around said electro-magnetic means, an indicating dial, said indicating member having a pointer coöperating with said dial, and a hand-operated pointer moved when said contact device moves and coöperating with said dial.

5. A combined electrical order transmitting and receiving instrument comprising, in combination, a case, a hand-operated contact device rotatably mounted within said case, a substantially cylindrical wall having a plurality of insulated contact segments coöperating with said hand-operated contact device to close transmitting circuits for transmitting an order from the instrument, a rotatable indicating member, and electromagnetic means surrounded by said wall for actuating said indicating member by a receiving circuit from a point remote from the case.

6. A combined electrical order transmitting and receiving instrument comprising, in combination, a case, a hand-operated contact device rotatably mounted within said case, a substantially cylindrical wall having a plurality of insulated contact segments coöperating with said hand-operated contact device to close transmitting circuits for transmitting an order from the instrument, a rotatable indicating member, and a plurality of substantially circumferentially arranged electro-magnets surrounded by said wall adapted to be energized by a receiving circuit controlled at a point remote from the case, operating to control the said rotatable indicating member.

7. A combined electrical order transmitting and receiving instrument, comprising, in combination, a case, a plurality of substantially circumferentially disposed electro-magnets adapted to be energized by a receiving circuit from a point remote from the case, a rotatable indicating member controlled by said electro-magnets, a hand-operated contact device rotatably mounted within said case, and a plurality of circumferentially disposed contact segments coöperating therewith for closing transmitting circuits from the instrument, said segments disposed in the space surrounding said electro-magnets.

8. A combined electrical order transmitting and receiving instrument comprising, in combination, a case, a rotatable indicating member mounted in said case, a plurality of substantially circumferentially disposed electro-magnets adapted to be energized by a receiving circuit for controlling said indicating member, a holder supported by said case and supporting said electro-magnets, a plurality of circumferentially disposed contact segments within said case in the space surrounding said electro-magnets, and a hand-operated contact device rotatably mounted upon said case and said holder for closing transmitting circuits through said segments to transmit orders from the instrument.

9. A combined electrical order transmitting and receiving instrument comprising, in combination, a case, a rotatable indicating member mounted in said case, a plurality of substantially circumferentially disposed electro-magnets adapted to be energized by a receiving circuit for controlling said indicating member, a holder attached toward its outer edge to the case supported by said case and having a pocket receiving and supporting said electro-magnets, a plurality of circumferentially disposed contact segments within said case in the space surrounding said pocket, and a hand-operated contact device rotatably mounted upon said case and said holder for closing transmitting circuits through said segments to transmit orders from the instrument.

10. A combined electrical order transmitting and receiving instrument, comprising, in combination, a case, an order indicating dial, a movable handle having a pointer coöperating with and movable around said dial, a contact device operated by said handle for controlling transmitting circuits for transmitting different orders corresponding to the different positions of said hand-operated indicating pointer, electro-magnetic means within said case and in concentric relation with said contact device, said means being adapted to be connected in an order receiving circuit, and an indicating member controlled by said electro-magnetic means and mounted on said dial to assume positions thereon opposite said first named pointer.

11. A combined electrical order transmitting and receiving instrument, comprising, in combination, a case, a substantially cylindrical wall within said case, a plurality of insulated contact segments on the inner face of said wall, a rotatable indicating member mounted in said case, a plurality of substantially circumferentially disposed electro-magnets adapted to be energized by a receiving circuit for controlling said indicating member, a holder having a pocket receiving said electro-magnets, and having its outer portion supported on said case adjacent said wall, and a hand-operated movable contact member moving in the space between said pocket and said wall for closing transmitting circuits through said segments to transmit orders from said instrument.

12. A combined electrical order transmitting and receiving instrument, comprising, in combination, a case, a substantially cylindrical wall within said case, a plurality of insulated contact segments on the inner face of said wall, a rotatable indicating member mounted in said case, a plurality of substantially circumferentially disposed electro-magnets adapted to be energized by a receiving circuit for controlling said indicating member, a holder having a pocket receiving said electro-magnets, and having its outer portion supported on said case adjacent said wall, a hand-operated movable contact member moving in the space between said pocket and said wall for closing transmitting circuits through said segments to transmit orders from said instrument, a lever for controlling said hand-operated contact member, a pointer carried thereby, and a common indicating dial coöperating with said indicating member and said pointer.

13. A combined electrical order transmitting and receiving instrument, comprising, in combination, a case having a substantially cylindrical wall, a plurality of insulated contact segments disposed around the inner face of said wall, a rotatable indicating member mounted in said case, a plurality of electro-magnets adapted to be energized by a receiving circuit for controlling said indicating member, a spider having its outer portion supported on said case and having its middle portion disposed near the rear wall of said case, said spider having a pocket at the middle portion thereof for receiving and supporting said electro-magnets, a hand-operated contact device rotatably mounted in the rear wall of the case and rotatably mounted in the central portion of said spider for coöperating with said segments to close transmitting circuits leading from the instrument, a lever for controlling said hand-operated contact member, a pointer carried thereby, and a common indicating dial for said pointer and said indicating member.

14. A combined electrical order transmitting and receiving instrument, comprising, in combination, an indicating member having a pointer for indicating an order received by the instrument, electro-magnetic means for controlling said indicating member by a receiving circuit, a hand-operated contact device for closing transmitting circuits to transmit an order from the instrument, said hand-operated device having a concentric relation with said electro-magnetic means within the instrument with the device external of the means and having a pointer, a common dial coöperating with said pointers, and a special signal actuated by the instrument when the character of the transmitted order changes.

In testimony whereof I have hereunto set my hand in presence of two subscribing witnesses.

FRANK W. WOOD.

Witnesses:
 F. D. AMMEN,
 JOHN J. HALEY.